United States Patent [19]

Maples

[11] Patent Number: 4,494,002
[45] Date of Patent: Jan. 15, 1985

[54] PISTOL-SHAPED DOSIMETER CHARGER

[75] Inventor: Robert A. Maples, Powell, Tenn.

[73] Assignee: The United States of America as represented by the United States Department of Energy, Washington, D.C.

[21] Appl. No.: 460,502

[22] Filed: Jan. 24, 1983

[51] Int. Cl.$^3$ ............................................. G01T 1/142
[52] U.S. Cl. ................................................... 250/377
[58] Field of Search ................ 250/377, 378, 376, 375

[56] References Cited

U.S. PATENT DOCUMENTS

| | | | |
|---|---|---|---|
| 2,761,073 | 8/1956 | Carlbom et al. | 250/376 |
| 4,247,775 | 1/1981 | Kronenberg | 250/377 |
| 4,281,250 | 7/1981 | Kronenberg et al. | 250/377 |
| 4,430,569 | 2/1984 | Manning | 250/377 |
| 4,449,049 | 5/1984 | Manning | 250/377 |

OTHER PUBLICATIONS

E. D. Gupton, "Health Physics Instrument Manual" Oak Ridge National Laboratory, ORNL-332 (5th Rev.), Aug. 1978, pp. 42-43.
"Repair and Maintenance Manual for Civil Defense Radiological Instruments" vol. 4, Secs. 19 (pp. 1-11) and 23 (pp. 16-17), Office of Civil Defense, Washington, D.C.

Primary Examiner—Janice A. Howell
Assistant Examiner—Constantine Hannaher
Attorney, Agent, or Firm—Earl L. Larcher; Stephen D. Hamel; Michael F. Esposito

[57] ABSTRACT

A pistol-shaped charger assembly clamps a cylindrical radiation dosimeter against one edge thereof. A trigger-like lever on the handgrip of the assembly is manually pivoted to actuate a piezoelectric current generator held in the handgrip and thereby charge the dosimeter.

8 Claims, 3 Drawing Figures

PISTOL-SHAPED DOSIMETER CHARGER

BACKGROUND OF THE INVENTION

This invention, which resulted from a contract with the United States Department of Energy, relates generally to an electric device and, more particularly, to a hand-held assembly for charging a radiation dosimeter of the electrometer type.

As is well-known, radiation dosimeters of the electrometer type require charging to a selected degree before use and recharging after extended storage or exposure to radiation. There is a need for an inexpensive, portable charger in which a radiation dosimeter can conveniently be recharged by an ordinary person.

U.S. Pat. No. 4,247,775, issued to S. Kronenberg on Jan. 27, 1981, discloses a dosimeter charger in which a charging voltage is produced by manually applying a force to a piezoelectric crystal. A manually actuated dosimeter charger is described in Repair and Maintenance Manual For Civil Defense Radiological Instruments, Vol. 4, published by the Office of Civil Defense, Washington, D.C. U.S. Pat. No. 2,761,073, issued to L. E. Carlbom et al on Aug. 28, 1956, discloses a radiation dosimeter provided with a charger which generates an electric voltage when shaken. Co-pending, co-assigned U.S. Pat. application Ser. Nos. 343,607(79) now U.S. Pat. No. 4,449,049, and 358,960(79), now U.S. Pat. No. 4,430,569, also relate to manually operated chargers for radiation dosimeters. The subject matter of all of these documents is to be considered as being incorporated herein by this reference thereto.

SUMMARY OF THE INVENTION

It is an object of this invention to provide an improved device for charging a radiation dosimeter.

Another object of the invention is to provide a charging assembly in which a radiation dosimeter can quickly and conveniently be inserted for charging.

An additional object of the invention is to provide a charging assembly in which radiation dosimeters of different length can be held.

These objects are attained by a preferred embodiment of the invention comprising: a hand-held pistol-shaped housing including a handgrip and an elongate stock having a rear section which extends across one end of said handgrip and a forward section which projects laterally from said handgrip and terminates in a free end; dosimeter abutment means attached to and projecting laterally from the free end of said stock, said dosimeter, when in a charging position on said assembly, extending lengthwise of said stock and one of its ends engaging said dosimeter abutment means; a dosimeter clamping lever pivotally connected to said housing on the side of said handgrip remote from said laterally projecting section of said stock and including a lower section which extends lengthwise of said handgrip and an upper section which extends across and projects laterally from the adjacent end of said stock, the pivotal axis of said dosimeter clamping lever being perpendicular to the longitudinal axis of said stock; means mounted on said housing for resiliently biasing the upper section of said dosimeter clamping lever toward said dosimeter abutment means on said stock and against the other end of said dosimeter when the dosimeter is in said charging position on said assembly; and manually actuated charging means carried by said housing for applying an electric current to said dosimeter when it is in said charging position on said assembly.

DETAILED DESCRIPTION OF THE PREFERRED EMBODIMENT OF THE INVENTION

Figure 1:
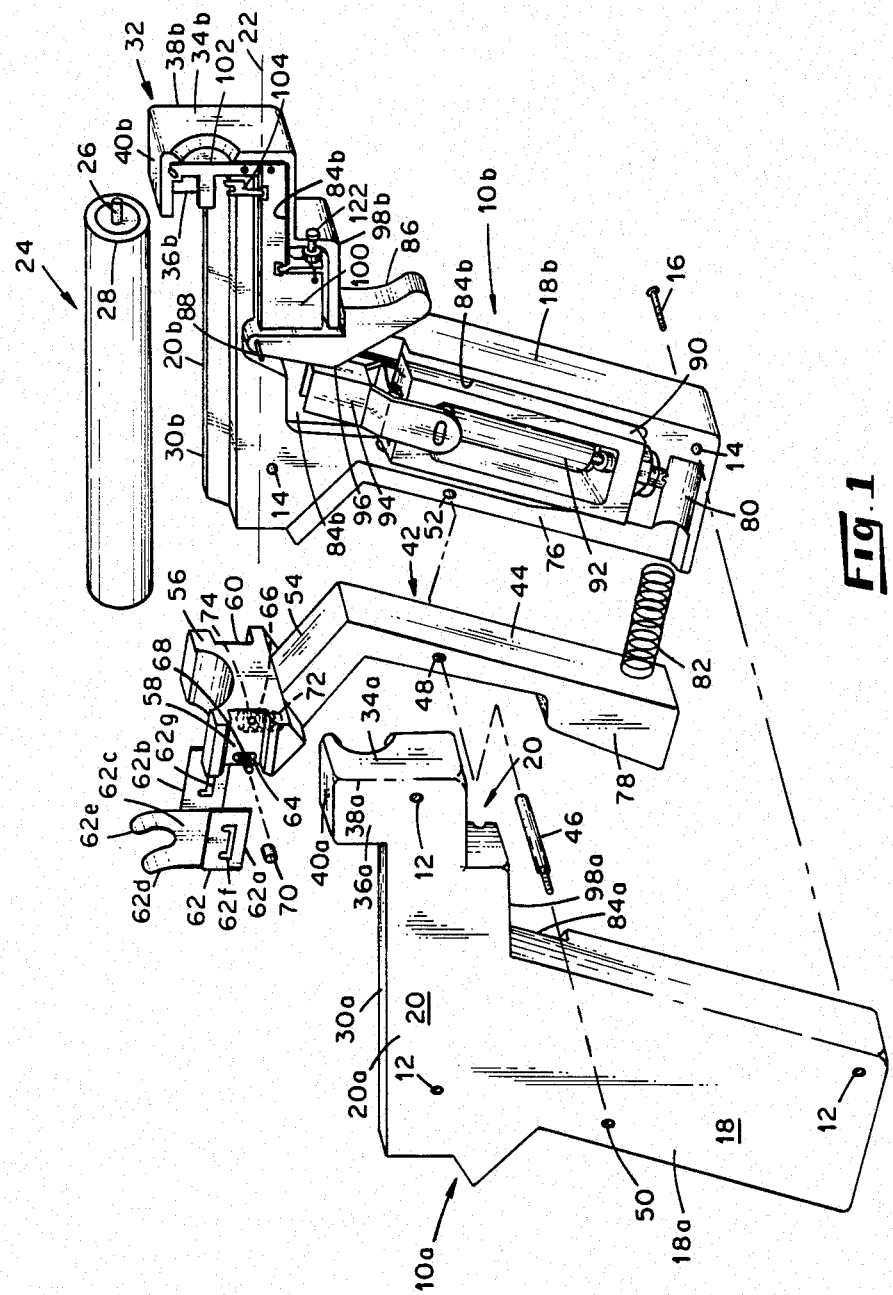
FIG. 1 is a view in which complementary sections of the pistol-shaped housing of the preferred embodiment of the invention, and a dosimeter clamping lever which is pivoted to the housing, are shown separated from each other so that components mounted within the housing can be clearly seen.

In FIG. 1, complementary half section of a pistol-shaped housing are respectively generally designated by reference number 10a, 10b, housing half section 10a being provided with threaded holes 12 and housing half section 10b being provided with unthreaded holes 14 in which bolts 16 (only one of which is illustrated) are received to clamp the sections together. The portions of the housing half sections which form the handgrip of the housing are respectively designated 18a, 18b, and the complementary halves of a stock which extends across and projects laterally from the upper end of the handgrip are respectively designated 20a, 20b. In the following description, the handgrip and the stock of the housing in assembled form will be referred to by reference numbers 18, 20 respectively. The longitudinal axis 22 of stock 20 is represented for the purpose of facilitating an understanding of the arrangement of pivoting components of the assembly, which will be described hereinafter.

Illustrated above housing half section 10b in FIG. 1 and generally designated in the drawing by reference number 24 is a cylindrical dosimeter of the type manufactured by Bendix Corporation and sold as its Dosimeter Model CD V-730, the dosimeter having a charging pin 26 and grounding ring 28 at one end thereof. Each half section 20a, 20b of stock 20 is formed with a longitudinally extending shoulder 30a, 30b, thus providing a groove which extends between the ends of the stock in the assembled housing and in which dosimeter 24 is held when in a charging position. Reference number 32 generally designates an abutment means which projects laterally from the upper surface of stock 20 and which comprises (1) complementary walls forming a cup-shaped wall structure, and (2) electrical contact electrodes mounted therein in the assembled housing. More particularly, when the housing sections 10a, 10b are joined, the aforesaid wall structure of abutment means 32 includes (1) a centrally apertured end wall which is perpendicular to the longitudinal axis 22 of stock 20 and which is formed by half end walls 34a, 34b, (2) two side walls 36a, 36b respectively joined to opposite side edges 38a, 38b of the aforesaid end wall and projecting therefrom toward the rear section (i.e., the section extending across the end of handgrip 18) of stock 20, and (3) a top wall consisting of half top walls 40a, 40b which are respectively joined to the upper edges of said side walls 36a, 36b and end walls 34a, 34b.

Reference number 42 generally designates a dosimeter clamping lever which includes a lower section 44 pivotally connected on the rear edge of handgrip 18 by a pin 46 which is perpendicular to axis 22 and which passes through an aperture 48 in the lower section and extends into apertures 50, 52 respectively located in the half section 18a, 18b of said handgrip. Clamping lever 42 also comprises an upper section consisting of (1) an arm 54 disposed at an angle to the lower section, (2) support block 56 projecting upward from said arm and having grooves 58, 60 in opposite sides thereof, and (3) a generally U-shaped pressure-applying clip 62 which is formed of sheet metal and which has parallel legs 62a, 62b respectively slidably disposed in said grooves 58, 60 and a base 62c extending between adjacent ends of said legs and formed with spaced, parallel ears 62d, 62e. A U-shaped slot 62f, 62g extends through each leg 62a, 62b, a hole 64 having an oblong cross-sectional shape extends between the bottom surfaces of the grooves 58, 60 in support block 56, and another hole 66 extends from the middle of hole 64 to the outer surface of the support block. A rod 68 is positioned in hole 64 with its ends respectively extending through the slots 62f, 62g in clip 62, and retainers (only one of which is illustrated in FIG. 1 in spaced relation to the rod and designated therein by reference number 70) are respectively secured to the ends of the rod to hold it within the support block 56. A helical spring 74 is bottomed in the hole 72 and compressed by rod 68 to urge the latter toward the upper side of slot 64. A groove (only one of which is illustrated and designated by reference number 76) is formed in the rear edge of each half section 18a, 18b of handgrip 18, and lower section 44 and arm 54 of clamping lever 42 fit into the slot formed by the two grooves when the half section 18a, 18b are assembled, with the enlargement 78 at the end of lower section 44 projecting outward from the edge of the handgrip. A semicylindrical groove (only one of which is illustrated in FIG. 1 and designated by reference number 80) is formed in the lower end of each half section 18a, 18b of handgrip 18, and a helical spring 82 is disposed in the cylindrical hole formed by these grooves to resiliently urge the upper section of clamping lever 42 toward dosimeter abutment means 32.

Each housing half section 10a, 10b is formed with a large slot 84a, 84b (only one of which is illustrated in its entirety in FIG. 1 and designated by reference number 84b) which extends from the forward edge of its respective handgrip half section 18a, 18b downward into said handgrip half section and upward into the respective stock half section 20a, 20b. One end of a triggerlike lever 86 is pivotally mounted in the upper portion of the cavity formed by the slots in the handgrip half section 18a, 18b by means of a pin 88 which is perpendicular to axis 22 and the ends of which are respectively positioned in holes (not illustrated) in the handgrip half sections. A support frame 90 conformably fits in the lower portion of the cavity in handgrip 18, and a piezoelectric current generator 92 having a generally U-shaped, swingable actuator element 94 associated therewith is carried by the support frame with its upper end in contact with the cam surface 96 formed on one side of lever 86.

Figure 2:
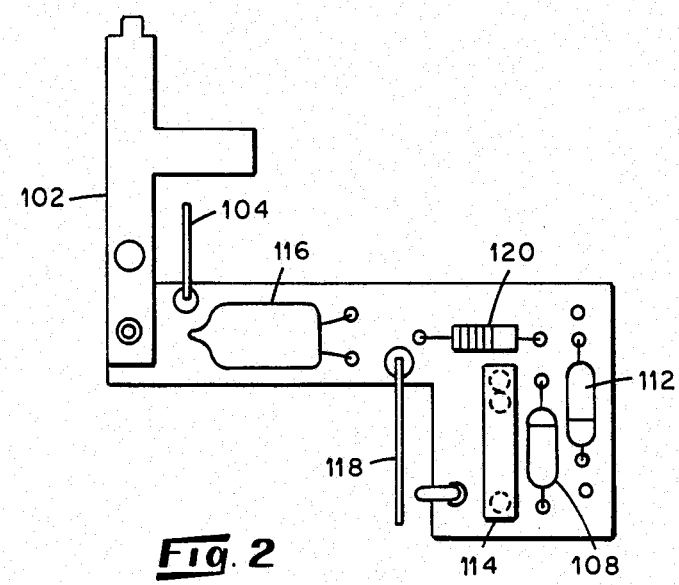
FIG. 2 is a view showing the reverse side of a printed circuit board illustrated in its attached position on one of the housing sections in FIG. 1.

The portion of each section 20a, 20b of stock 20 which projects laterally from handgrip 18 is formed with a shoulder 98a, 98b, and slot 84b in housing half section 10b extends into both shoulder 98b and the thinner portion of the forward end of stock section 20b. A generally L-shaped printed circuit board 100 is situated in this forwardly extending portion of slot 84b. As illustrated in FIG. 2, electrical components which will be described hereinafter are mounted on the side of the board 100 which is hidden in FIG. 1. The printed circuit board also serves as a support for a first T-shaped contact electrode 102 and a second generally Y-shaped contact electrode 104 both of which extend into the cavity formed by the walls of dosimeter abutment means 32, the arms of electrode 102 being perpendicular to axis 22, the stem of the same electrode projecting toward the rear section of stock 20 in parallel relation with axis 22, and the arms of electrode 104 lying substantially in a plane perpendicular to axis 22.

As illustrated schematically in FIG. 2, electrode 102 is connected to the positive side of current generator 92 by a lead wire 106 having a first diode 108 therein; electrode 104 is connected to the negative side of the generator by a lead wire 110; and a second diode 112, a capacitor 114, a neon lamp 116, and a switch 118 are connected in parallel between the lead wires 106, 110, the switch having a resistor 120 connected in series therewith between the lead wires and being operated by a push button 122 (shown in FIG. 1) mounted on the charging assembly above lever 86.

OPERATION OF THE PREFERRED EMBODIMENT OF THE INVENTION

The operation of a radiation dosimeter such as that illustrated in FIG. 1 and identified therein by reference number 24 is fully described in the aforementioned U.S. Patent application Ser. No. 343,607(79) and accordingly will not be stated herein. When a person wishes to charge dosimeter 24 by use of the herein disclosed charging assembly, handgrip 18 and the enlargement 78 on dosimeter clamping lever 52 are gripped by one hand to pivot the lower portion of the lever into the slot at the rear edge of the handgrip. This, of course, moves support block 56 and clip 62 mounted thereon away from dosimeter abutment means 32 on stock 20 of the assembly, permitting placement of a dosimeter 24 in the groove which extends lengthwise of the stock and engagement of charging pin 26 and grounding ring 28 of the dosimeter with contact electrode 102 and contact electrode 104, respectively. Clamping lever 52 is then released to permit spring 82 to press ears 62d, 62e of clip 62 against the adjacent end of dosimeter 24. It should be noted that the mounting arrangement of clip 62 on the upper end of clamping lever 42 allows the clip to be moved to two different positions on support block 56, thus allowing dosimeters of two different lengths to be held in the charging assembly. Change of the position of clip 62 on the support block 56 can be accomplished by pressing pin 58 downward in slot 62 in the support block and then sliding the legs 62a, 62b of the clip in grooves 58, 60.

Figure 3:
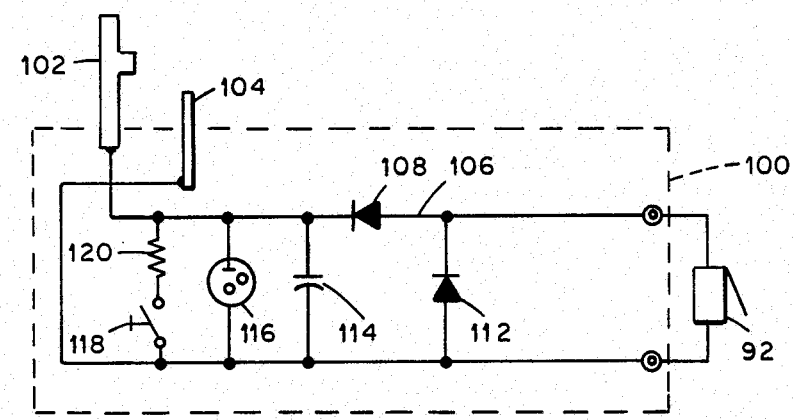
FIG. 3 is a schematic representation of the electrical circuit utilized in the preferred embodiment of the invention.

After dosimeter 24 has been inserted into the charging assembly, lever 86 is pivoted by the user's index finger, which in turn pivots arm 54 and thereby generates an electric current which flows to and from the dosimeter via electrodes 102, 104 and the conventional electric circuitry illustrated in FIG. 3, as will be readily understood by persons skilled in the art of electronics. Neon lamp 116 seves as an indicator of electrical operation and as a voltage (charge) limiter to protect the dosimeter from excessive overcharge. If dosimeter 24 is overcharged by excessive movement by lever 86, button 122 can be pressed to slowly leak off some of the charge so as to permit zero setting of the dosimeter.

Among the advantages provided by the disclosed charger design are the following.

1. It is easy for ordinary persons to insert a dosimeter into charging position therein.
2. It can accommodate existing dosimeters of different length.
3. Because of its pistol-like structure, it can easily be operated by either hand.
4. Viewing of the charge indicator inside a dosimeter held in the charger is facilitated by the design of clip 62 and dosimeter abutment means 32.
5. It is durable in construction and inexpensive to manufacture.
6. Various types of current generators can be accommodated in the hollow handgrip 18 and actuated by lever 86.

What is claimed is:

1. An assembly for charging a cylindrical radiation dosimeter, comprising:
    a hand-held, pistol-shaped housing including a handgrip and an elongate stock having a rear section which extends across one end of said handgrip and a forward section which projects laterally from said handgrip and terminates in a free end;
    dosimeter abutment means attached to and projecting laterally from the free end of said stock, said dosimeter, when in a charging position on said assembly, extending lengthwise of said stock and one of its ends engaging said dosimeter abutment means;
    a dosimeter clamping lever pivotally connected to said housing on the side of said handgrip remote from the laterally projecting section of said stock and including a lower section which extends lengthwise of said handgrip and an upper section which extends across and projects laterally from the adjacent end of said stock, the pivotal axis of said dosimeter clamping lever being perpendicular to the longitudinal axis of said stock;
    means mounted on said housing for resiliently urging the upper section of said dosimeter clamping lever toward said dosimeter abutment means on said stock and against the other end of said dosimeter when the dosimeter is in said charging position on said assembly; and
    manually actuated charging means carried by said housing for applying an electric current to said dosimeter when it is in said charging position on said assembly.

2. The assembly of claim 1 wherein said handgrip is hollow; and
    said charging means comprises a piezoelectric current generator disposed within said handgrip.

3. The assembly of claim 2 wherein said charging means comprises:
    a second triggerlike lever pivotally connected to said housing adjacent the juncture of said handgrip and the projecting forward section of said stock, the pivotal axis of said second lever being perpendicular to the longitudinal axis of said stock; and
    means carried by said housing and operably associated with said second lever for actuating said piezoelectric current generator when said second lever is pivoted about its pivotal axis.

4. The assembly of claim 3 wherein a pair of grooves respectively extend along opposed sides of said upper section of said dosimeter clamping lever in substantially parallel relation with the longitudinal axis of said stock; and including:
    a generally U-shaped pressure-applying clip formed of sheet metal and having parallel legs which are respectively slidably disposed in said grooves and a base which extends between adjacent ends of said legs and which has a pair of ears projecting from one edge thereof for engaging said other end of said dosimeter; and
    means for adjustably holding said legs of said clip in different positions in said grooves.

5. The assembly of claim 4 including:
    a U-shaped slot in each leg of said clip;
    a hole extending through the upper section of said dosimeter clamping lever between the bottom surfaces of said grooves therein, said hole having an oblong cross-sectional shape;
    a rod positioned in said hole with its opposite ends respectively extending into the slots in the legs of said clip; and
    means carried by said dosimeter clamping lever for resiliently urging said rod into the end portions of the slots in the legs of said clip.

6. The assembly of claim 5 wherein said dosimeter abutment means includes:
    a centrally apertured end wall perpendicular to the longitudinal axis of said stock, two side walls respectively joined to opposite side edges of said end wall and projecting therefrom toward the rear section of said stock in parallel relation with each other, and a top wall joined to the edges of said side walls and said end wall, said contact means thus being formed with a cavity open toward the rear section of said stock;
    a first T-shaped contact electrode fixed in position within said cavity in said dosimeter abutment means, the arms of said first contact electrode being perpendicular to the longitudinal axis of said stock and the stem of said first contact electrode projecting from said arms toward the rear section of said stock in parallel relation with the longitudinal axis of said stock; and
    a second contact electrode fixed in position within said cavity in said contact means between the stem of said first contact electrode and the forward section of said stock.

7. The assembly of claim 6 wherein said charging means includes:
    a printed circuit board carried by the forward section of said stock, said first and second contact electrodes being fixed to said printed circuit board; and
    electrical components attached to said printed circuit board and electrically connected to said piezoelectric current generator.

8. The assembly of claim 7 wherein a groove extends lengthwise of said stock on the side thereof remote from said handgrip for receiving said dosimeter.

* * * * *